US008567664B2

(12) United States Patent
Goodwin et al.

(10) Patent No.: US 8,567,664 B2
(45) Date of Patent: Oct. 29, 2013

(54) SECURE ATM DEPOSIT

(75) Inventors: James D. Goodwin, Gladstone, MO (US); Dion Bellamy, Weldons Spring, MO (US); Janet Slayton, Gladstone, MO (US)

(73) Assignee: Bank of America Corporation, Charlotte, NC (US)

( * ) Notice: Subject to any disclaimer, the term of this patent is extended or adjusted under 35 U.S.C. 154(b) by 782 days.

(21) Appl. No.: 12/413,933

(22) Filed: Mar. 30, 2009

(65) Prior Publication Data

US 2010/0247000 A1 Sep. 30, 2010

(51) Int. Cl.
*G07D 11/00* (2006.01)
*G06F 19/00* (2011.01)

(52) U.S. Cl.
USPC .......... 235/379; 194/206

(58) Field of Classification Search
USPC .......... 235/32, 100, 379, 380, 381
See application file for complete search history.

(56) References Cited

U.S. PATENT DOCUMENTS

| | | | | |
|---|---|---|---|---|
| 2,612,092 | A | 9/1952 | Heyer et al. | |
| 5,813,510 | A * | 9/1998 | Rademacher | 194/206 |
| 6,082,519 | A | 7/2000 | Martin et al. | |
| 6,934,688 | B2 * | 8/2005 | Carter | 235/382 |
| 7,121,461 | B2 * | 10/2006 | Washington et al. | 235/379 |
| 7,347,358 | B2 * | 3/2008 | Ireland et al. | 235/379 |
| 2005/0189266 | A1 | 9/2005 | Fujita et al. | |
| 2007/0109097 | A1 | 5/2007 | Coutermarsh et al. | |
| 2008/0158002 | A1 | 7/2008 | Parkinson et al. | |

FOREIGN PATENT DOCUMENTS

| | | |
|---|---|---|
| EP | 0 852 279 A2 | 7/1998 |
| EP | 0852279 A2 * | 7/1998 |
| JP | 2008-171334 | 7/2008 |

OTHER PUBLICATIONS

Merriam Webster Website, Definition of "retrofit" retrieved from http://www.merriam-webster.com/dictionary/retrofit on Dec. 15, 2011.*

Merriam Webster Website, Synonyms of "alert" retrieved from http://www.merriam-webster.com/thesaurus/alert on Dec. 15, 2011.*

International Search Report and the Written Opinion of the International Searching Authority mailed Jun. 2, 2010 for International Application No. PCT/US2010/029237.

International Preliminary Report on Patentability for International Application No. PCT/US2010/029237 mailed Oct. 13, 2011.

* cited by examiner

*Primary Examiner* — Daniel Hess
(74) *Attorney, Agent, or Firm* — Michael A. Springs; Moore & Van Allen PLLC; Padowithz Alce

(57) ABSTRACT

Embodiments of the present invention relate to a secure cash deposit bin housed in an automated teller machine (ATM) for receiving cash from customers, and methods and systems for using the secure cash deposit bin. Embodiments of the present invention provide a cash deposit bin, with a lid, in which there is a receptacle that receives cash and automatically seals the cash within it when the secure cash deposit bin is opened. An exemplary system further includes the secure cash deposit bin comprising a limited-entry device in the lid and an access sensor locking device on the bin.

26 Claims, 4 Drawing Sheets

SECURE ATM DEPOSIT

BACKGROUND

Financial institutions that receive cash payments or deposits from customers using automated systems require effective approaches for receiving and protecting all cash deposited. It can be challenging for financial institutions to verify, account for, and secure cash deposits, as cash transactions do not leave a "footprint" linking them to a particular customer, and are not traceable by procedures typically used to track other types of transactions involving forms of payment such as checks, credit cards, and debit cards. This problem is of particular concern for financial institutions whose customers use automated teller machines (ATMs) to make deposits that include cash.

Traditionally, financial institution customers making out-of-lobby or off-hours deposits would enclose their deposited cash in an envelope or money bag. However, a newer generation of ATMs uses imaging systems to receive deposits. Use of an imaging system means that the deposited cash for a particular transaction is not bound together in any way; rather, it is fed into the ATM so that each bill is imaged separately. Thus, use of an imaging system results in the deposited cash being placed, unbound and free of any enclosure, into the ATM. The cash inside an ATM is accessible to anyone who can open the ATM's service door and access its inner workings, such as ATM service technicians and armored truck carriers.

SUMMARY

Embodiments of the present invention provide a secure cash deposit bin for receiving cash deposited into an automated teller machine (ATM). Embodiments of the present invention provide a secure cash deposit bin comprising a lid and a receptacle positioned inside the bin that receives deposited cash, and wherein the receptacle automatically seals the cash within it when the secure cash deposit bin is opened. In some embodiments, the receptacle is a tamper-proof bag. In some embodiments, the receptacle further comprises a tracking device, such as an RFID tag.

In at least some embodiments, the secure cash deposit bin further comprises a limited-entry device in the lid for receiving cash into the bin. In some embodiments, the limited-entry device is a one-way flap.

In at least some embodiments, the secure cash deposit bin further comprises an access sensor locking device.

In at least some embodiments, the access sensor locking device creates a log including a date, a time, and a user identification corresponding to each locking event.

In at least some embodiments, the secure cash deposit bin is retrofitted to function in an existing ATM.

In at least some embodiments, the secure cash deposit bin comprises an alert system that is activated if an unauthorized locking event is detected.

In at least some embodiments, the secure cash deposit receptacle for use in an automated teller machine (ATM) comprises an automatically sealing receptacle positioned to receive cash deposited into the ATM, wherein no bin is needed. In some embodiments, the automatically sealing receptacle is a tamper-proof bag.

In at least some embodiments, the secure cash deposit bin comprises a lid and an access sensor locking device positioned to lock the lid onto the secure cash deposit bin.

In some embodiments, the invention is implemented via either a standalone instruction execution platform or such a platform interconnected with other platforms or data stores by a network, such as a corporate intranet, a local area network, or the internet. A computer program product or computer program products contain computer programs with various instructions to cause the hardware to carry out, at least in part, the methods and processes of the invention. Data sets may include access sensor locking device data, lock system alert data, ATM monitoring system data, and tracking device data. Any comparisons may be made using the data sets. Data sets may be stored locally or accessed over a network.

BRIEF DESCRIPTION OF THE DRAWINGS

Figure 1:
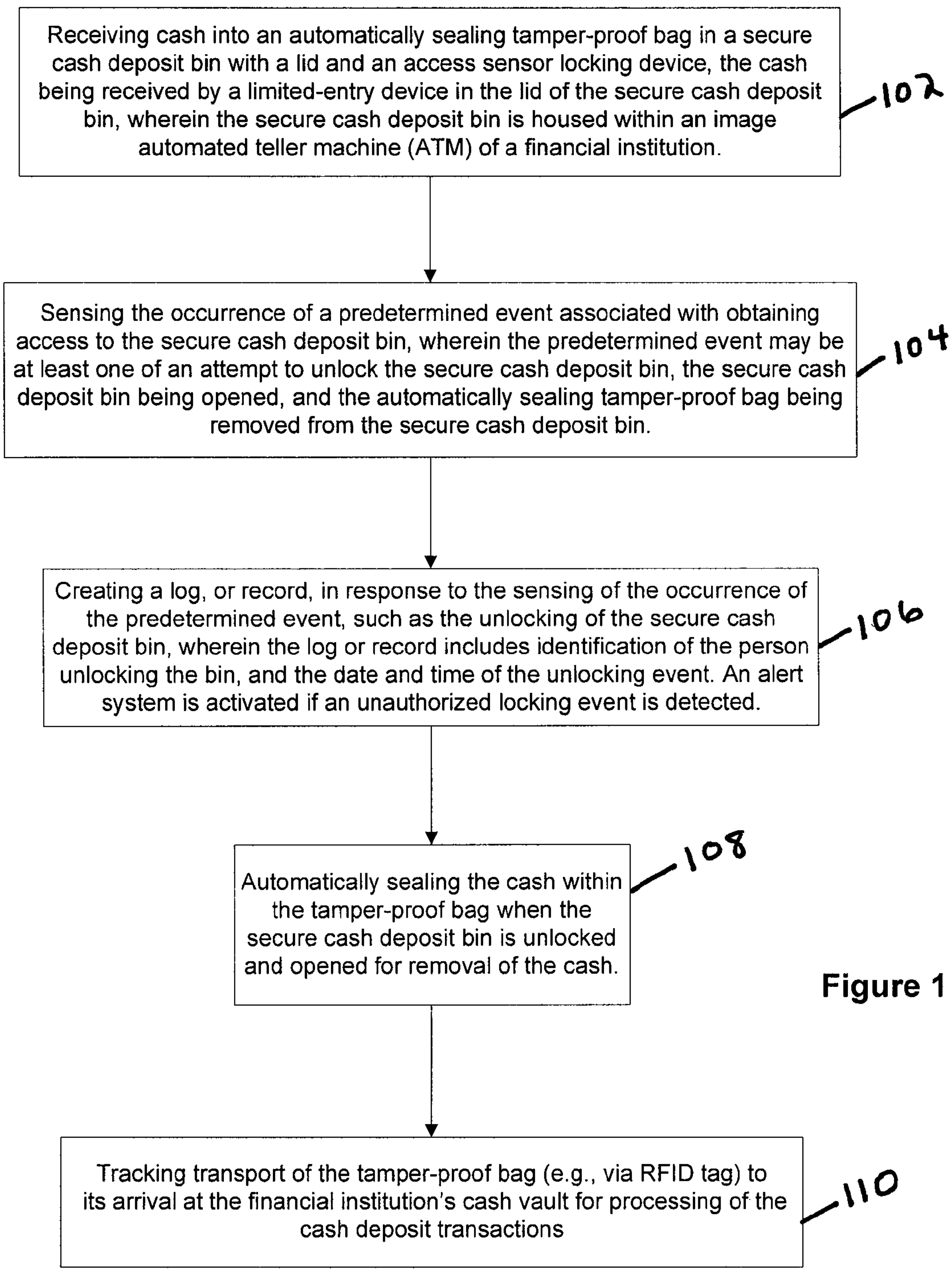

Having thus described embodiments of the invention in general terms, reference will now be made to the accompanying drawings:

FIG. 1 is a flowchart that illustrates a method of using a secure cash deposit bin according to example embodiments of the invention.

Figure 2:
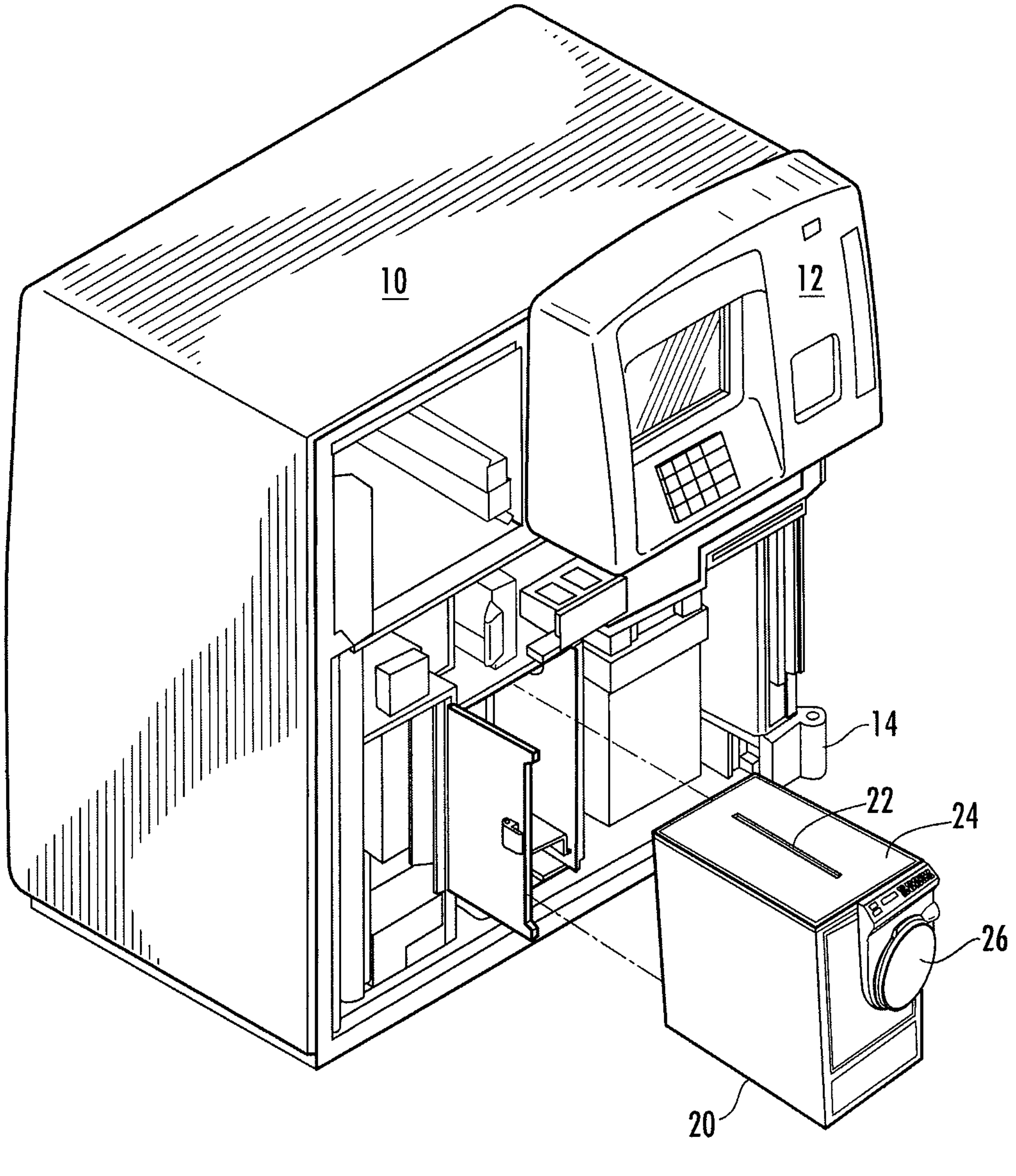

FIG. 2 is a diagram that presents a perspective view of an ATM as might be used according to example embodiments of the invention.

Figure 3:
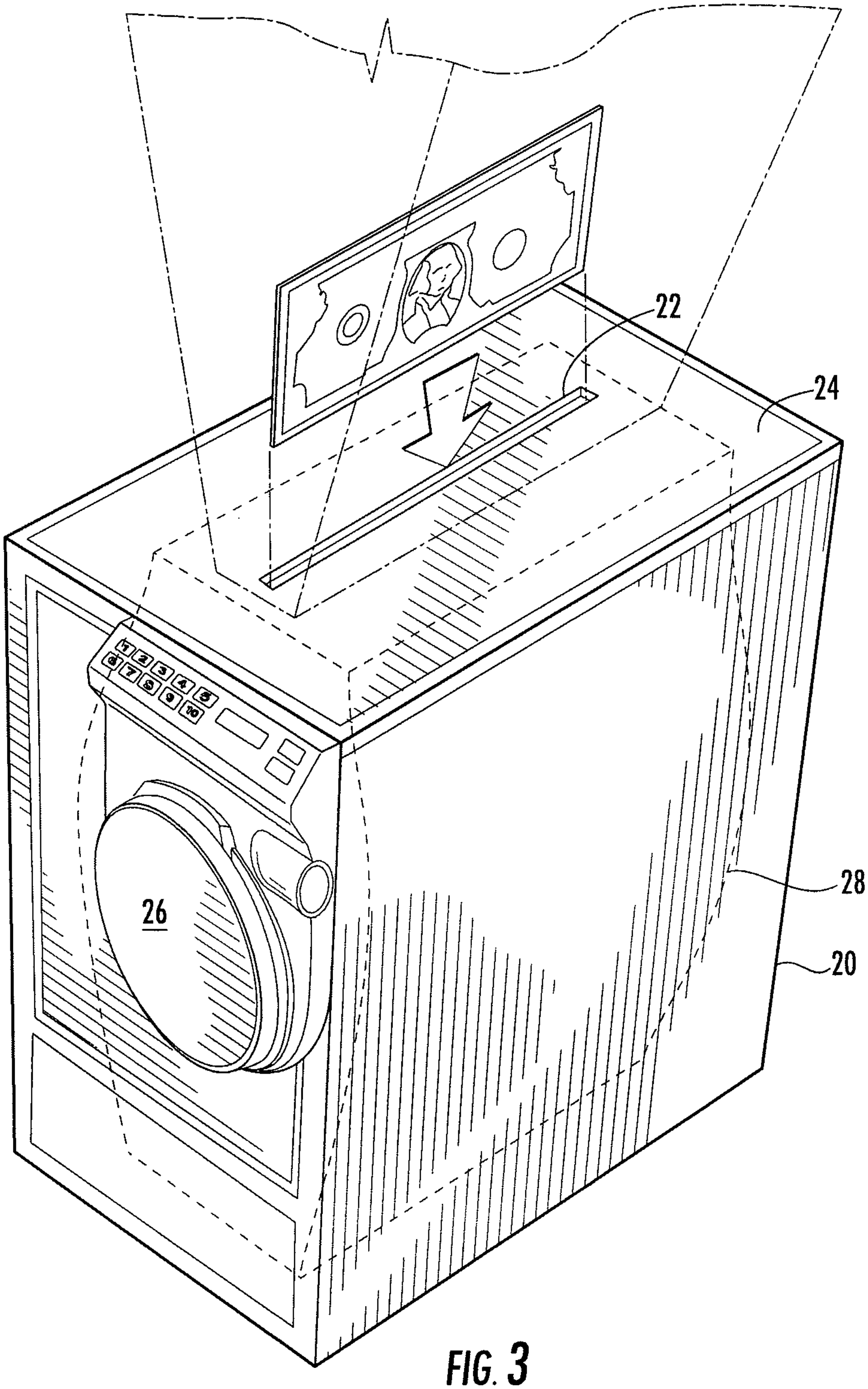

FIG. 3 is a diagram that presents a view of a secure cash deposit bin, as might be used according to example embodiments of the invention.

Figure 4A:
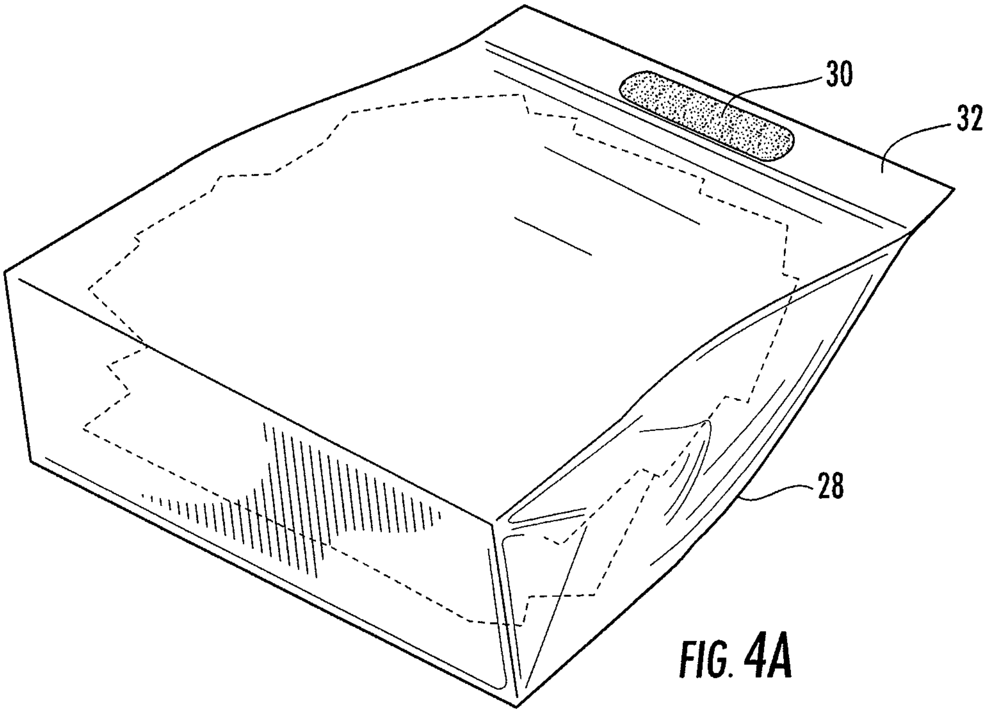
Figure 4B:
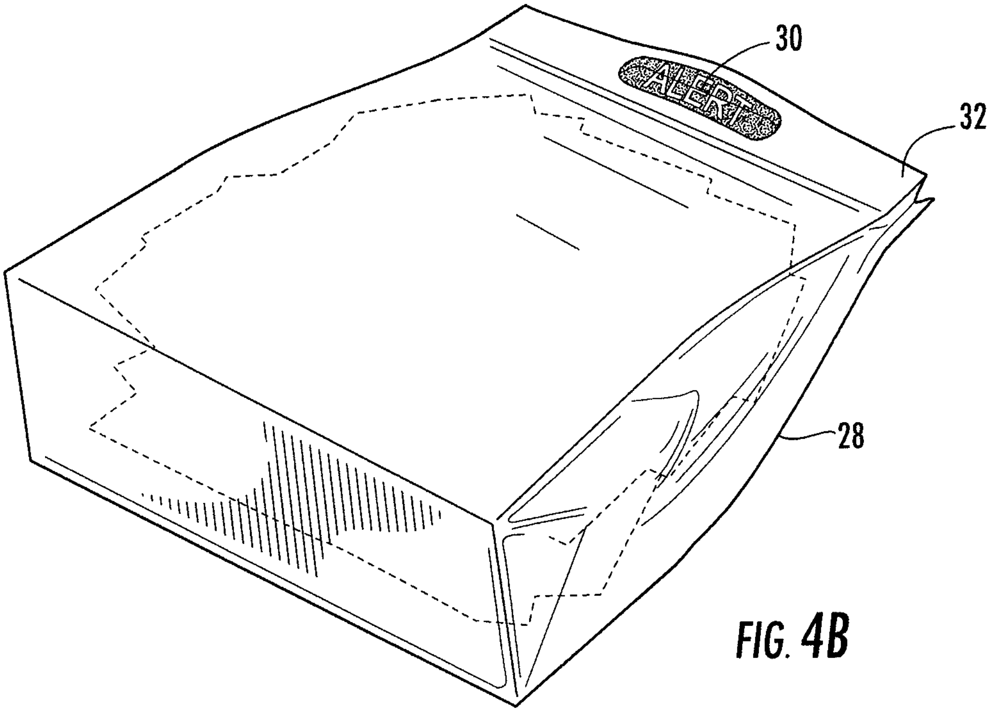

FIGS. 4A and 4B are diagrams that present a view of a tamper-proof bag, as might be used according to example embodiments of the invention.

DETAILED DESCRIPTION OF THE INVENTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

As will be appreciated by one of skill in the art, various portions of the present invention may be embodied as a device, method, system, computer program product, or a combination of the foregoing. Accordingly, the present invention may partially take the form of a software embodiment (including firmware, resident software, micro-code, etc.) or an embodiment combining, in various portions, software and hardware aspects that may generally referred to herein as part of a "system". Software and/or hardware may be utilized in combination with a device or method as described herein. Furthermore, embodiments of aspects of the present invention may take the form of a computer program product on a computer-readable medium having computer-usable program code embodied in the medium. Examples of aspects of the present invention that might take such form include aspects of electronic features such as sensors, electronic locks, electronic monitoring systems, etc.

Embodiments of the present invention are described below with reference to flowchart illustrations and/or block diagrams of methods and apparatus (systems), which may include computer program products. It will be understood that a block of the flowchart illustrations and/or block diagrams, and/or combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

The computer program instructions may be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing some of the functions/acts specified in the flowchart and/or block diagram block(s). Alternatively, computer program implemented steps or acts may be combined with operator or human implements steps or acts in order to carry out an embodiment of the invention.

The following description is based on an exemplary implementation of an embodiment of the invention for use in securing cash deposited in an automated teller machine (ATM). A secure cash deposit bin provides a device, method and system for securing cash deposited in an ATM, wherein the secure cash deposit bin comprises a lid and a receptacle that receives the cash and automatically seals the cash within it when the secure cash deposit bin is opened. In some embodiments, the secure cash deposit bin comprises a limited-entry device for receiving cash and an access sensor locking device. In some embodiments, the cash bin is retrofitted to function in an existing ATM.

In at least some embodiments, the secure cash deposit bin comprises an alert system that is activated upon unauthorized access. In some other embodiments, the alert system is part of the locking device system. Specifically, a secure cash deposit bin designed for use in an ATM of a financial institution is described below as an exemplary embodiment of the invention.

The secure cash deposit bin of the present invention provides protection for cash deposited in an ATM, and may serve as part of a more comprehensive system of monitoring and protecting the ATM. Protection of the cash contained in the secure cash deposit bin may be provided by a plurality of approaches. For example protective measures may be employed to prohibit unauthorized removal of cash from the bin, such as an access sensor locking device that not only physically locks the bin, but by means of an electronic sensor enables a determination of whether the bin has been accessed and if so, identifying who accessed it. By way of another example, a tracking device, such as a radio-frequency identification (RFID) tag, may be used for determining the location of the receptacle that receives the cash within the bin. Yet another example includes a monitoring and notification system for tracking activity with regard to the ATM, or lack thereof.

Cash deposited in typical ATMs is vulnerable to being stolen or lost. This is because under typical conditions the cash is accessible to anyone who can open the ATM for any reason. In many ATM models, a service door allowing access to the interior of the ATM must be opened in order to access the cash cassettes, the receipt printer, the imaging system, the deposit bins, etc. The cash deposit bin is accessible after the service door is opened. This means that the cash from deposits made by customers is accessible to anyone who opens the service door of the ATM.

An ATM may require frequent fault servicing, and the servicing technicians may be employees of the ATM vendor, not the financial institution. "Fault servicing" includes tasks such as replenishing cash reserves in the ATM, clearing bill jams, and replenishing paper in the receipt printer, among other maintenance tasks that must be performed in order to maintain the functionality of the ATM. Most fault servicing tasks require opening the ATM's service door and accessing the ATM's interior.

Deposits placed in the ATM are picked up by armored truck carriers (who are also not usually employees of the financial institution), who must open the ATM's service door and remove the cash from the cash deposit bin(s) for delivery to the financial institution's cash vault. The workflow issues, created by a plurality of people involved in maintenance of the ATM and retrieval of cash deposits, leave the ATM cash deposits vulnerable, as the cash is not enclosed or monitored, and is accessible to anyone who can open the service door of the ATM.

Further complicating the process of tracking the cash deposited at ATMs is that some ATMs now employ an imaging system for deposits. ATMs that employ an imaging system for deposits are called "image ATMs". The purpose of the imaging system is to capture images of the checks and bills that are deposited, so that a record of the deposit is created and the customer receives immediate credit for the deposit. While providing improved customer service with regard to verification of the deposit, this creates further complications with tracking the cash, due to the fact that in the image ATM systems, the deposited items are not contained in an envelope, as would be the case with a traditional deposit system. Rather, the bills are left loose and fed into the ATM so that an image can be captured of each item, and then the imaged loose bills are fed into the cash deposit bin. The result is an easily accessible cash deposit bin containing loose bills. The present invention offers improved security for cash deposits made at image ATMs.

The following description is based on an exemplary implementation of an embodiment of the invention in an image ATM of a financial institution. As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

In general, and as an exemplary embodiment, a secure cash deposit bin designed for use in an image ATM is described in more detail as follows. The secure cash deposit bin of the exemplary embodiment enables bank customers to confidently make cash deposits at an image ATM. Although an image ATM is discussed throughout this disclosure, the present invention may also be applicable to any other type of ATM, or any other place or device associated with the financial institution. The secure cash deposit bin improves the customer-bank interaction experience for both the customer and the bank by, among other things, providing a secure, tamper-proof means for customers to make cash deposits at any time of the day or night.

FIG. 1 is a flowchart depicting an overview of the secure cash deposit bin system in at least some embodiments wherein the secure cash deposit bin is housed within an image ATM. The image ATM receives a cash deposit into an automatically-sealing tamper-proof bag. The automatically-sealing tamper-proof bag may be located within in a secure cash deposit bin having a lid and an access sensor locking device, the cash being received into a limited-entry device in the lid of the secure cash deposit bin 102. While the present embodiment discusses the automatically-sealing tamper-proof bag being located within the bin, it should be understood that the tamper-proof bag does not necessarily have to be contained within the bin and may be freestanding or contained within another area or device.

The secure cash deposit bin system senses the occurrence of a predetermined event associated with obtaining access to the secure cash deposit bin, wherein the predetermined event may be at least one of an attempt to unlock the secure cash deposit bin, the secure ATM deposit bin being opened, the automatically sealing tamper-proof bag being removed from the secure cash deposit bin, the interior of the ATM being accessed, an activation by a bank representative, or any other activation 104.

The secure cash deposit bin system creates a record, or log, in response to the sensing of the occurrence of the predetermined event 106, wherein the event is a locking event. The log may contain, but is not limited to, information such as the identity of the user associated with the locking event, as well as the date and time of the locking event. Other information may be collected, and alerts may be sent, in response to the sensing of an occurrence of any predetermined events, such as the removal of the automatically sealing tamper-proof bag from the secure cash deposit bin.

The secure cash deposit bin system automatically seals the cash within the tamper-proof bag when the secure cash deposit bin is unlocked and opened 108. In one embodiment, a sealable bag, without a bin, may be utilized to receive and/or secure deposits from the ATM. Nonetheless, to seal the bag, a sealing means may be employed, such as a device that operates to seal all openings of the bag. This may be accomplished by clamping a fastener on the bag, melting the open ends of the bag together, or any other way to seal or close the opening of the bag. By sealing the opening of the bag, the ATM cash deposits are secured therein so that they may not easily exit the bag.

The secure cash deposit bin system tracks movement of the tamper-proof bag 110 via a tracking system, such as a radio frequency identification (RFID) system. Use of an RFID system in the present invention may include, for example, placing an RFID tag within the tamper-proof bag which permits tracking of the tamper-proof bag to its arrival at the financial institution's cash vault for processing of the cash deposit transactions.

Embodiments of the invention described herein serve to receive and/or secure cash deposits or payments made, for example, at an ATM. FIG. 2 represents an ATM 10 in which the secure cash deposit bin 20 of the present invention may be used. It is noted that the specific model or type of ATM does not matter, as the secure cash deposit bin of the present invention is retrofitted to work with any existing ATM, including any image ATMs. FIG. 2 illustrates the interior components of the ATM made accessible after the service door of the ATM is opened. For clarity, the service door is not shown in FIG. 2, but if present would be attached to the ATM in part at hinge 14.

The customer feeds the ATM deposit (e.g., cash, checks, etc.) into the ATM at a designated location, generally in the area of the display screen and keypad 12. The precise location of the customer deposit feed is not visible in FIG. 2, as in the ATM 10 it would be on the front panel of the service door, likely in the area just above where the bin 20 resides in the ATM's interior. The precise location of the customer deposit feed is not important to the instant invention, and will vary from one ATM model to the next.

Once the deposit is fed into the ATM, it travels into the secure cash deposit bin 20 through a limited-entry device in the lid of the secure cash deposit bin 22. In the embodiment illustrated herein, the limited-entry device is a slot 22. Other limited-entry devices may be used in the invention, and one of skill in the art will recognize that the use of other limited-entry devices does not change the scope of the invention.

The slot 22 may be any means to receive the ATM deposit into the bin, such as an opening shaped and sized similar to a typical ATM deposit. In one embodiment, the slot is the only opening in the bin system. In another embodiment, the opening of the slot may be a sealable opening such that ATM deposits may be received in the slot and not allowed to exit the slot. Further, the slot may be such that a person may not reach into the slot to retrieve any of the contents therein.

The slot 22 can also be seen with respect to FIG. 3, wherein the slot 22 is shown receiving a cash bill into the interior of the bin and into a tamper-proof bag 28 inside the bin. In some embodiments, the tamper-proof bag 28 may be cooperatively coupled to the interior of the ATM so that the cash deposits are received directly into the tamper-proof bag 28, and no bin 20 is used.

FIG. 3 illustrates details of the secure cash deposit bin 20 in at least one embodiment of the invention. The bin, in addition to the tamper-proof bag 28 already discussed, may further comprise a lid 24 which may be fixed with a lock 26 so that access to the contents of the bin is limited. The lock 26 may be an access sensor locking device. The term "access sensor locking device," as used herein, refers to a lock that has at least one security feature in addition to physically securing the lid to the bin. The possible security features include, but are not limited to, a sensor cooperatively coupled to an activation means (e.g., a remote control, a button located outside of the ATM, a sensor indicating opening or damaging of the ATM, etc.). The sensor may respond to predetermined events, such as unauthorized access to the interior of the ATM.

As used herein, the term "user" refers to any person who has business to conduct with the ATM that may involve opening the service door of the ATM and accessing the interior of the ATM. Examples of users include financial institution employees, ATM vendor employees, and armored truck employees.

A user may be assigned a key that serves as a personal identifier, so that when the key is used to access the lock, the locking device system recognizes the person. The key that serves as a personal identifier may be, for example, an encrypted electronic key. Additionally, in some embodiments, a user may be required to have possession of more than one access feature in order to unlock the bin, such as possession of an electronic key plus a lock combination code. In some embodiments, the combination code may be a one-time combination code that will only work once, and must be newly assigned at each locking event. A "locking event", as the term is used herein, refers to any attempt to lock, unlock and/or remove the access sensor locking device.

Other possible security features include requiring at least two access features that must be carried out by at least two separate individuals, so that the lock can never be unlocked by a single individual. Further security features may include creation of "time windows", so that a particular user or users can only open the lock within predefined time frames.

The access sensor locking device creates a log of events, including, but not limited to, information such as a date, a time, and a user identification corresponding to each locking event.

Further locking device security features may include alerts sent upon detection of unauthorized access to the lock and/or the bin. The access sensor locking device may further be used in correlation with a standard ATM monitoring and notification system, which sends and receives messages remotely with regard to the status of the ATM. It is noted that locking devices with security features are known to those of skill in the art, and one of skill in the art would recognize that the precise features of the particular locking device used do not affect the scope of the invention as described herein.

The lid of the secure cash deposit bin includes a limited-entry device which serves to inhibit easy removal of cash from the bin, as well as inhibiting the insertion of items other than cash into the bin. In some embodiments, the limited-entry device is a thin slit in the lid of the bin through which bills can pass. In some embodiments, the limited-entry device may be a one-way flap, the flap being made of a rigid material, wherein the flap is mounted on a hinge so that it swings open in one direction far enough to let a bill pass through. The flap is mounted on the hinge so that it moves out of the way enough to allow bills to go into the bin, but does not allow removal of bills from the bin. For example, the flap may be positioned so that it can be pushed down into the bin through an opening of a size appropriate for a bill to pass through, but the flap cannot be pulled up away from the bin—when pulled, it instead serves to seal the bin shut.

In some embodiments, the flap further comprises a spring-loaded mechanism so that it snaps shut again after the bill passes into the bin. In still further embodiments, bills may be forcibly fed (pushed or pulled) through the flap by a mechanical means. It is noted that one-way flaps are known to those of skill in the art, and one of skill in the art would recognize that the precise features of a particular one-way flap do not affect the scope of the invention as described herein.

In some embodiments, the secure cash deposit bin has inserted within it a receptacle into which the cash is received. In other embodiments, the receptacle resides in the interior of the ATM without a bin. The receptacle automatically seals when the lid of the secure cash deposit bin is opened or removed. In some embodiments, the receptacle is a tamper-proof bag. The bag may have any of a plurality of security features, including but not limited to an identifying number or bar code. The bag may be sealed by any known means, such as the use of a fastener, use of an adhesive, or heat applied to melt the plastic material of the bag to form a seal. The precise method used to seal the bag does not affect the scope of the invention described herein.

The tamper-proof bag 28 is shown in FIG. 4. The tamper-proof bag may have any of a number of security features, including an alert band at the top of the bag 30 that serves as an indicator of whether the bag has been opened, or tampered with. As can be seen in the embodiment illustrated in FIG. 4A, if the tamper-proof bag 28 has been sealed at the open ends 32 and has not been subsequently tampered with, the alert band remains unchanged. In FIG. 4B, it can be seen that if the tamper-proof bag has been opened, or tampered with, after sealing, the alert band 30 will change to read "ALERT". Further, the sealed ends 32 may no longer be sealed. Other security features for tamper-proof bags are known to those of skill in the art, and may be employed in the present invention.

In some embodiments, the ATM may employ the tamper-proof bag without use of a secure cash deposit bin. The tamper-proof bag may be connected directly to where the ATM deposit is dispensed into the interior of the ATM so that the bag receives the ATM deposit. After a predetermined activity, the tamper-proof bag is sealed by a sealing means. The predetermined activity may be any activity to indicate that the bag needs to be sealed, such as an opening or accessing of the interior of the ATM, or other activity.

The automatically sealing tamper-proof bag may further comprise features for tracking the location of the bag. An example of a tracking system that could be used is an RFID system, wherein the bag would contain an RFID tag, but any system by which the location of the bag could be tracked may be used in the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A secure cash deposit bin for use in an automated teller machine (ATM), comprising:
- the secure cash deposit bin housed within the ATM and comprising a lid;
- an access sensor locking device comprising, at least, a lock and a sensor configured to at least, determine an occurrence of a predetermined event associated with the secure cash deposit bin and record information associated with the predetermined event associated with the secure cash deposit bin in an information log, wherein in response to the sensor determining the occurrence of the predetermined event associated with the secure cash deposit bin, the access sensor locking device is configured to:
  - determine whether or not the secure cash deposit bin has been accessed;
  - physically lock the secure cash deposit bin; and
- an automatically sealing tamper-proof bag positioned inside the secure cash deposit bin that receives cash deposited into the ATM, wherein the automatically sealing tamper-proof bag's seal comprises an indicator that displays an indication of whether the tamper-proof bag has been opened after being sealed.

2. The secure cash deposit bin of claim 1, wherein the tamper-proof bag further comprises a tracking device.

3. The secure cash deposit bin of claim 2, wherein the tracking device is a radio frequency identification (RFID) tag.

4. The secure cash deposit bin of claim 1, further comprising a limited-entry device in the lid for receiving cash into the bin.

5. The secure cash deposit bin of claim 4, wherein the limited-entry device is configured to receive ATM deposits and not allow removal of received ATM deposits through the limited-entry device.

6. The secure cash deposit bin of claim 1, wherein the access sensor locking device creates a log comprising a date, a time, and a user identification corresponding to a locking event occurrence.

7. The secure cash deposit bin of claim 1, wherein the cash deposit bin is a bin that is previously associated with an existing ATM, wherein the cash deposit bin is modifiable to add the automatically sealing tamper-proof bag and the access sensor locking device to work in conjunction with the existing ATM.

8. The secure cash deposit bin of claim 1, further comprising an alert system that is activated if an unauthorized locking event is detected.

9. The secure cash deposit bin of claim 1, wherein in response to the sensor determining the occurrence of the predetermined event associated with the secure cash deposit bin, the access sensor locking device is further configured to identify the one or more users that initiated the occurrence of the predetermined event.

10. The secure cash deposit bin of claim 1, wherein in response to the occurrence of the predetermined event associated with the secure cash deposit bin, the automatically sealing tamper-proof bag is sealed.

11. A method of securing the cash deposited in a cash deposit bin housed in an automated teller machine (ATM), comprising:
- providing a secure cash deposit bin within an ATM, wherein the secure cash deposit bin has a lid with an access sensor locking device, wherein the access sensor locking device comprises, at least, a lock and a sensor configured to at least determine an occurrence of a predetermined event associated with the secure cash deposit bin and record information associated with the predetermined event associated with the secure cash deposit bin in an information log, wherein in response to the sensor determining the occurrence of the predetermined event associated with the secure cash deposit bin, the access sensor locking device is configured to:
  - determine whether or not the secure cash deposit bin has been accessed;
  - physically lock the secure cash deposit bin;
- providing an automatically sealing receptacle positioned inside the secure cash deposit bin, wherein the automatically sealing receptacle's seal comprises an indicator that displays an indication of whether the bag has been opened after being sealed;
- receiving cash deposited into the ATM into the automatically sealing receptacle positioned inside the secure cash deposit bin; and
- sealing the automatically sealing receptacle when the lid of the secure cash deposit bin is opened.

12. The method of claim 11, wherein the automatically sealing receptacle is a tamper-proof bag.

13. The method of claim 11, wherein the automatically sealing receptacle further comprises a tracking device.

14. The method of claim 13, wherein the tracking device is a radiofrequency identification (RFID) tag.

15. The method of claim 11, further comprising a limited-entry device in the lid for receiving cash into the bin.

16. The method of claim 15, wherein the limited-entry device is configured to receive ATM deposits and not allow removal of received ATM deposits through the limited-entry device.

17. The method of claim 11, wherein the access sensor locking device creates a log comprising a date, a time, and a user identification corresponding to a locking event occurrence.

18. The method of claim 11, further comprising modifying, by adding new features, a cash deposit bin previously associated with an existing ATM into the secure cash deposit bin in order to function in the existing ATM.

19. The method of claim 11, further comprising activating an alert system if an unauthorized locking event is detected.

20. A cash deposit bin for use in an automated teller machine (ATM), comprising:
- a secure cash deposit bin housed within an ATM and comprising a lid; and
- an access sensor locking device positioned to lock the lid onto the secure cash deposit bin, wherein the access sensor locking device comprises, at least, a lock and a sensor configured to at least, determine an occurrence of a predetermined event associated with the secure cash deposit bin and record information associated with the predetermined event associated with the secure cash deposit bin in an information log, wherein in response to the sensor determining the occurrence of the predetermined event associated with the secure cash deposit bin, the access sensor locking device is configured to:
  - determine whether or not the secure cash deposit bin has been accessed; and
  - physically lock the secure cash deposit bin.

21. The secure cash deposit bin of claim 20, wherein the access sensor locking device creates a log including a date, a time, and a user identification corresponding to a locking event occurrence.

22. A method of securing the cash deposited in a cash deposit bin housed in an automated teller machine (ATM), comprising:
- providing an automatically sealing receptacle positioned inside an ATM, wherein the automatically sealing receptacle comprises an indicator that displays an indication of whether the tamper-proof bag has been opened after being sealed;
- receiving cash deposited into the ATM into the automatically sealing receptacle positioned inside the secure cash deposit bin;
- sealing the automatically sealing receptacle upon occurrence of a predetermined activity; and
- determining with an access sensor locking device a record of the predetermined activity, wherein the access sensor locking device comprises, at least, a lock and a sensor configured to at least, determine an occurrence of a predetermined event associated with the secure cash deposit bin and record information associated with the predetermined event associated with the secure cash deposit bin in an information log, wherein in response to the sensor determining the occurrence of the predetermined event associated with the secure cash deposit bin, the access sensor locking device is configured to:
  - determine whether or not the secure cash deposit bin has been accessed; and
  - physically lock the secure cash deposit bin.

23. The method of claim 22, wherein the automatically sealing receptacle is a tamper-proof bag.

24. A cash deposit bin for use in an automated teller machine (ATM), comprising:
- a secure cash deposit bin housed within an ATM and comprising a lid;
- an access sensor locking device comprising, at least, a lock and a sensor configured to, at least, determine an occurrence of a predetermined event associated with the secure cash deposit bin and record information associated with the predetermined event associated with the secure cash deposit bin in an information log, wherein in response to the sensor determining the occurrence of the predetermined event associated with the secure cash deposit bin, the access sensor locking device is configured to:

determine whether or not the secure cash deposit bin has been accessed;

physically lock the secure cash deposit bin;

an automatically sealing receptacle positioned inside the secure cash deposit bin that receives cash deposited into the ATM; and an alert system that is activated if an unauthorized locking event occurs.

25. The secure cash deposit bin of claim 24, wherein the automatically sealing receptacle is a tamper-proof bag.

26. The secure cash deposit bin of claim 24, wherein the automatically sealing receptacle further comprises a tracking device.

* * * * *